United States Patent [19]

Schmid et al.

[11] Patent Number: 5,352,286
[45] Date of Patent: Oct. 4, 1994

[54] GAS-PHASE PASSIVATION OF METAL PIGMENTS

[75] Inventors: Raimund Schmid, Neustadt; Norbert Mronga, Dossenheim; Juan A. G. Gomez, Ludwigshafen, all of Fed. Rep. of Germany

[73] Assignee: BASF Aktiengesellschaft, Ludwigshafen, Fed. Rep. of Germany

[21] Appl. No.: 135,620

[22] Filed: Oct. 14, 1993

[30] Foreign Application Priority Data

Oct. 28, 1992 [DE] Fed. Rep. of Germany ....... 4236332

[51] Int. Cl.$^5$ .............................................. C09C 1/62
[52] U.S. Cl. .................................... 106/404; 106/403; 106/453; 106/479; 427/213; 427/216; 427/217; 427/218; 427/250; 427/255.1; 427/255.2
[58] Field of Search ............... 106/403, 404, 453, 479; 427/213, 216, 217, 218, 250, 255.1, 255.2

[56] References Cited

U.S. PATENT DOCUMENTS

| | | | |
|---|---|---|---|
| 2,904,523 | 9/1959 | Hawkins, Jr. et al. | 524/25 |
| 4,484,951 | 11/1984 | Uchimura et al. | 106/290 |
| 4,565,716 | 1/1986 | Williams, Jr. et al. | 427/216 |
| 4,808,231 | 2/1989 | Kondis et al. | 106/404 |
| 4,869,754 | 9/1989 | Kawabe et al. | 106/404 |
| 5,026,429 | 6/1991 | Mronga et al. | 106/400 |
| 5,028,639 | 7/1991 | Treutlein et al. | 523/200 |

FOREIGN PATENT DOCUMENTS

| | | |
|---|---|---|
| 0104075 | 3/1984 | European Pat. Off. . |
| 0170474 | 2/1986 | European Pat. Off. . |
| 0305560 | 3/1989 | European Pat. Off. . |
| 0033457 | 8/1991 | European Pat. Off. . |
| 4030727 | 4/1992 | Fed. Rep. of Germany . |
| 2053258 | 2/1981 | United Kingdom . |

*Primary Examiner*—Mark L. Bell
*Assistant Examiner*—Scott L. Hertzog
*Attorney, Agent, or Firm*—Oblon, Spivak, McClelland, Maier & Neustadt

[57] ABSTRACT

A simple process for achieving very active passivation of metal pigments against hydroxyl-containing compounds comprises treating the metal pigments with passivators in the gas phase.

8 Claims, No Drawings

GAS-PHASE PASSIVATION OF METAL PIGMENTS

The present invention relates to a novel process for preparing water-resistant metal pigments, in particular those based on metal oxide-coated or uncoated aluminum flakes.

For environmental reasons there has been a growing trend in recent years toward minimal-solvent coating systems. The substantial replacement of organic solvents by water has led to a number of difficulties with the production of paints and printing inks that contain metal pigments.

Metal pigments, for example aluminum flakes, undergo an exothermic reaction with water $$2Al + 6H_2O \rightarrow Al(OH)_3 + 3H_2$$

with the evolution of hydrogen. The change to the pigment surfaces—in an extreme case the complete destruction of the pigments—and the reducing properties of the evolved hydrogen, which can lead to chemical changes, for example to transparent color pigments present in the paint, greatly impair the optical properties of the paint (eg. gloss, brilliance, hue). Moreover, the evolution of hydrogen leads to an appreciable buildup of pressure on the inside of the containers and hence to a serious handling hazard.

On the other hand, it is specifically metallic coatings, which confer gloss and a brilliant appearance on articles coated therewith, that have enjoyed an ever-growing popularity over the last two decades.

No wonder, then, that the patent literature in particular contains a multiplicity of proposals for solving the above-described problem. A brief overview is given in the paper "Aluminium-pigmente für wässrige Beschichtungen - Widerspruch oder Wirklichkeit", by R. Besold, W. Reisser and E. Roth in Farbe+Lack 97 (4/1991), 311–314.

According to the cited paper, the methods for stabilizing aluminum pigments for aqueous systems can be divided into 2 groups.

The first group has in common that the pigments are coated with a protective coating. This can be organic in nature; see for example the phosphoric acid-modified resins described in Austrian Patent 372,696 or EP-A-0 319 971. The phosphoric acid groups act therein as adhesion promoters between the inorganic surface of the pigment and the organic coating. Similarly, the protective coating can be inorganic in nature, as for example in the case of the $SiO_2$-coated aluminum flakes disclosed in U.S. Pat. No. 2,885,366 or the $Fe_2O_3$- or $TiO_2$-coated aluminum pigments disclosed in aluminum pigments disclosed in EP-A- 0 033 457 or U.S. Pat. No. 5,026,429).

On the other hand, aluminum pigments can be protected by adsorbing corrosion inhibitors onto the surface. Corrosion inhibitors are in fact chemisorbed at reactive sites on the pigment surface, making these sites impervious to water. Use is made of chromates (EP-A-0 259 592, U.S. Pat. No. 2,904,523), vanadates (EP-A-0 305 560, EP-A-0 104 075), dimer acids (DE-A-3 002 175), phosphoric esters (DE-A-3 020 073, EP-A-0 170 474, U.S. Pat. No. 4,565.716, U.S. Pat. No. 4,808,231) or phosphates (eg.EP-A-0 305 560, EP-A-0 240 367).

The commonly used methods for stabilizing pigments against water are based on the fact that pigments are treated with the stabilizing reagents suspended in water or an organic solvent. This generally gives rise to heavy metal-polluted waste waters or organic solvents which have to be disposed of and which may additionally contain residual quantities of the stabilizing substances. Moreover, the stability of the abovementioned $TiO_2$- or $Fe_2O_3$-coated aluminum pigments to the attack of water is not improved to such an extent that they could be used in waterborne paints without further measures. The conventional processes for stabilizing metal oxide-coated aluminum pigments thus lead inevitably to products which need additional processing for passivation.

It is an object of the present invention to develop metal pigments, in particular based on aluminum, which are free of the abovementioned disadvantages, have advantageous application properties and shall be inexpensive and environmentally safe to produce.

We have found that this object is achieved by a process for passivating metal pigments against hydroxyl-containing compounds, which comprises treating the metal pigments with passivators in the gas phase.

The pigments preparable according to the invention can have as substrates any metal in platelet form known for metallic effect pigments; examples besides copper and its alloys, such as brass or bronzes, and iron and its alloys are in particular aluminum and its alloys. Preference is given to aluminum platelets, which are simple to obtain by aluminum foil punching or by customary atomizing or grinding techniques. It is possible to use commercially available products, although the metal surface should be substantially free of fats or other coatings.

The process of the invention is of course very particularly advantageous in the case of substrates already coated in the gas phase, since the passivation can then be carried out without interruption in the same reactor.

It is therefore advantageous to employ metal pigment substrates which are already coated with metal oxide, for example the titanium dioxide-coated aluminum flakes described in U.S. Pat. No. 5,026,429 and particularly preferably the iron oxide-coated aluminum flakes obtainable as described in EP-A-0 033 457.

The size of the substrate particles is not critical per se and can be conformed to the particular intended application. In general, the plateletlike particles have diameters of approximately 1–200 μm, in particular about 5–100 μm, and a specific surface area (BET) of from 0.5 to 15 m$^2$/g, in particular 1–7 m$^2$/g.

According to the invention, the passivators employed are in particular silicon or vanadium and preferably phosphorus or chromium compounds. Mixtures of passivators can also be used.

A particularly suitable passivating apparatus is a fluidized bed reactor.

A fluidized bed reactor consists in general of an externally heatable tube with a gas-permeable frit floor. Above the frit floor, gas inlet nozzles are located on the side. The egress of product at the top of the fluidized bed is prevented by filters.

Gas is passed in to fluidize the substrate to be passivated. Part of the fluidizing gas is loaded with one or more gasified compounds which are to effect passivation. These compounds react from the gas phase with active sites on the substrate (pigment) surfaces to be protected. Depending on the structure, the added, gaseous compounds may initially also react with one another to form the species which will react with the pigment surface.

A whole series of compounds are available for use as vaporizable, corrosion protectors.

Water resistance is obtained for example on treating the pigments with gaseous compounds formally derived from the oxygen acids of phosphorus.

Specific examples are the tri- and di- ($C_1$–$C_4$-alkyl)-esters of phosphoric acid of the formulae $(RO)_3P$ (R=methyl, ethyl, propyl, butyl, isopropyl or isobutyl) and $(RO)_2(HO)PO$ (R=methyl, ethyl).

Preference is given to the tri- and di-($C_1$–$C_2$-alkyl)-esters of phosphorous acid $(RO)_3P$ and $(RO)_2POH$, R=methyl or ethyl.

Water resistance is also obtained using phosphoryl halides of the type $POX_3$ (X=halogen). Preference is given for example to $POCl_3$, $POBr_2Cl$ or $POBr_3$.

Vaporizable oxyhalogenides, especially oxychlorides of some metals, too, confer water resistance on metal pigments treated therewith. For example, chromyl chloride ($CrO_2Cl_2$) gives gas phase-chromatized metal pigments; owing to the almost quantitative conversion in the gas phase there are no problems with the waste water as in wet-chemical chromatization. A further suitable starting compound for gas phase passivation according to the invention is $VOCl_3$ and also $VOBr_3$, and which leads to the formation of corrosion-inhibiting vanadate ions on the pigment surface.

The pigments passivated by phosphatization generally contain from 0.01 to 10, preferably from 0.1 to 5, wt% of phosphorus. The chromium content of chromatized pigments is as a rule from 0.01 to 10, preferably from 0.1 to 5, wt%. After passivation with vanadate, the pigments usually contain from 0.1 to 15, preferably from 0.5 to 12, wt% of vanadium.

The passivation of metal pigments in a fluidized bed reactor is preferably carried out as follows.

The substrates to be passivated are introduced into the reactor and fluidized by blowing nitrogen in through one or more inlets. Depending on the fluidizability of the particular substrate, this requires in total about 200–1000 l of nitrogen/h. After heating to the desired temperature, part of the fluidizing nitrogen is passed through a vaporizer vessel charged with a volatile passivator and becomes loaded with the passivator. Another part of the fluidizing gas is loaded with water vapor in a further, water-charged vaporizer and introduced into the reactor through a separate inlet. Concentrations of the gasified phosphorus, chromium or vanadium compounds, based on the gas introduced into the fluidized bed over the same time period, of less than 3% by volume are advantageous, but the concentration of the passivating species is preferably 0.001–0.5% by volume. The amount of added water vapor depends on the concentration of the passivating species. The amount of water should be at least stoichiometric and preferably is for example 10–100 times in excess. The decomposition of the phosphorus, chromium or vanadium compounds in the presence of water vapor leads to the formation of the passivating species.

The reactor temperature is chosen with regard to the starting compounds used. In general, the passivation requires temperatures within the range from 100° to 350° C. If, for example, a phosphatization of the substrates is effected starting from the phosphoryl chloride, the reaction temperature is preferably set within the range from 130° to 220° C. The time required for the passivation depends in particular on the temperature and the gas rate. It is readily optimizable in the same way as the other parameters. Customary times range from 1 to 10 hours. After the reaction is ended, the reactor is cooled down to room temperature before it is emptied.

After the reactor has been emptied, the metal pigments can be subjected to an additional polishing step to improve the luster. This can be done for example by stainless ball milling pigments together with about 50% by weight of naphtha for 8 hours.

A quick test of the efficiency of passivation, ie. of the water resistance of the pigments, is for example the boil test in water described in DE-A-4 030 727. In this test, 1.5 g of the metal pigment to be tested are predispersed as a paste in 10 g of butylglycol and then added to 150 g of water in a gastightly sealable apparatus. After heating to the boil the time taken for 400 ml of hydrogen to evolve is recorded. Aluminum pigments which have not been stabilized or which have merely been coated with metal oxide react to completion within a few minutes. The pigments prepared according to the invention, by contrast, require boil times of at least 15 hours until 400 ml of hydrogen have evolved. The Examples which follow will further illustrate the invention.

EXAMPLE 1

A mixture of 100 g of aluminum powder with an average particle diameter of 20 μm and a BET surface area of 4.5 m²/g and 100 g of a coarser aluminum powder (average particle diameter 60 μm, BET surface area 1.5 m²/g) was heated to 200° C. in the fluidized bed reactor under fluidization with nitrogen at a total gas rate of 800 l/h, 200 l/h being passed through a reservoir vessel heated to 70° C. and containing 10 ml of $POCl_3$, a further 200 l/h being loaded with water vapor in a second reservoir vessel heated to 50° C. and containing water, and the remainder being blown directly into the reactor at its lower end through the frit floor. After about 2 hours the total amount of $POCl_3$ was consumed. Analysis revealed 0.41% by weight of phosphorus in the passivated pigment. In the boil test the pigment evolved only 90 ml of hydrogen in 22 hours.

COMPARATIVE EXAMPLE 1

The untreated mixture of Example 1 was subjected to the boil test. The aluminum pigments decomposed within a few minutes with marked evolution of hydrogen.

EXAMPLE 2

150 g of the same mixture as in Example 1 were coated with iron oxide (starting from iron carbonyl) to a golden shade by the method described in EP-A-33 457 and immediately thereafter phosphatized in the gas phase in the same reactor using $POCl_3$.

To this end nitrogen was passed through a room temperature reservoir of 45 ml of iron carbonyl at a rate of 200 l/h. The $Fe(CO)_5$ vapor-loaded stream of nitrogen was injected into the reactor and oxidatively decomposed therein to $Fe_2O_3$ at 200° C. The oxygen necessary for the oxidative decomposition came from air blown into the reactor through a second opening at a rate of 100 l/h. What is important is that the concentration of the carbonyl vapor introduced does not exceed 5% by volume of the gases (fluidizing gas, combustion air) introduced into the fluidized bed over the same time period. The resulting iron oxide forms a film on the aluminum powder particles, turning them golden.

Thereafter the reactor temperature was reduced to 150° C. The carbonyl reservoir was replaced by a 10 ml reservoir of POCl$_3$ at 70° C. Using nitrogen at a rate of 200 l/h the entire quantity of POCl$_3$ was introduced into the reactor in vapor form in the course of about 2 hours. The moist nitrogen required for decomposing the POCl$_3$ vapor (400 l/h) was produced and introduced into the reactor as is described in Example 1. The ready-produced pigment contained 0.18% by weight of phosphorus.

In the boil test the gas phase-phosphatized pigment released 300 ml of hydrogen in the course of 25 hours. The above-described polishing of the passivated pigments has no adverse effect on the resistance to water.

COMPARATIVE EXAMPLE 2

The iron oxide-coated sample used for passivation in Example 3 was subjected to the boil test. It decomposed completely within about 10 minutes.

EXAMPLE 3

150 g of the same mixture as in Example 1 were heated to 150° C. in the fluidized bed reactor under fluidization with nitrogen at a total gas rate of 600 l/h, of which 200 l/h were first passed through a room temperature reservoir of 20 ml of VOCl$_3$. The remainder was loaded with water vapor by passing it through a water reservoir temperature controlled at 50° C. and was then likewise passed into the reactor through a further opening. After about 5 hours the total amount of VOCl$_3$ had vaporized.

The passivated aluminum pigment contained 6.6% of vanadium. In the boil test 360 ml of hydrogen evolved over 22 hours.

EXAMPLE 4

500 g of the iron oxide-coated, golden aluminum pigment prepared in Example 3 were passivated in a somewhat larger but otherwise identical reactor (internal diameter 16 cm) using trimethyl phosphite.

The passivation was carried out at a reactor temperature of 200° C. To fluidize the platelet-like substrate particles a stream of nitrogen at 1400 l/h was mixed with air at 90 l/h and the mixture was introduced into the lower part of the reactor. Half of this gas stream was first passed through a water reservoir temperature controlled at 50° C. to load it with water vapor. From a further vaporizer vessel 25 ml of trimethyl phosphite were transferred into the reactor in the course of 3 hours by passing nitrogen over it at room temperature at a rate of 260 l/h. The ready-produced pigment contained 1% by weight of phosphorus.

In the boil test the pigment thus coated and subsequently polished evolved 150 ml of hydrogen in the course of 24 h.

EXAMPLE 5

400 g of an aluminum pigment mixture as described in Example 1 were passivated in the fluidized bed reactor of Example 4 using trimethyl phosphite.

The passivation was carried out at a reactor temperature of 200° C. To fluidize the platelet-like substrate particles a stream of nitrogen at 1400 l/h was mixed with air at 90 l/h and the mixture was introduced into the lower part of the reactor. Half of this gas stream was first passed through a water reservoir temperature controlled at 50° C. to load it with water vapor. From a further vaporizer vessel 50 ml of trimethyl phosphite were transferred into the reactor in the course of 3 hours by passing nitrogen over it at room temperature at a rate of 260 l/h. The ready-produced pigment contained 1.4% by weight of phosphorus.

In the boil test the pigment thus coated and subsequently polished evolved 160 ml of hydrogen in the course of 24 h.

We claim:

1. A process for passivating metal pigments against hydroxyl-containing compounds, which comprises treating the metal pigments with passivators in the gas phase.

2. A process as claimed in claim 1, wherein the metal pigments are passivated against water.

3. A process as claimed in claim 1, wherein the passivators used are phosphorus, chromium or vanadium compounds or mixtures thereof.

4. A process as claimed in claim 1, wherein the passivators used are phosphorus or chromium compounds or mixtures thereof.

5. A process as claimed in claim 1, wherein passivation is effected in the presence of water vapor.

6. A process as claimed in claim 1, wherein the passivation is effected at from 100° to 350° C.

7. A process as claimed in claim 6, wherein the passivation is effected at from 130° to 220° C.

8. A process as claimed in claim 1, wherein uncoated or metal oxide-coated metal pigments of iron, iron alloys, copper, copper alloys, aluminum or aluminum alloys are passivated.

* * * * *